DIODE GATE AND SAMPLING CIRCUIT

Filed Aug. 22, 1956

INVENTORS J. T. BLAKE
A. L. ELY
BY Hugh S. Wertz
ATTORNEY

United States Patent Office 2,866,103

Patented Dec. 23, 1958

2,866,103

DIODE GATE AND SAMPLING CIRCUIT

John T. Blake, Parsippany, and Austin L. Ely, Whippany, N. J.; said Blake assignor to Bell Telephone Laboratories, Incorporated, New York, N. Y., a corporation of New York Application August 22, 1956, Serial No. 605,664

6 Claims. (Cl. 307—88.5)

Figure 1:
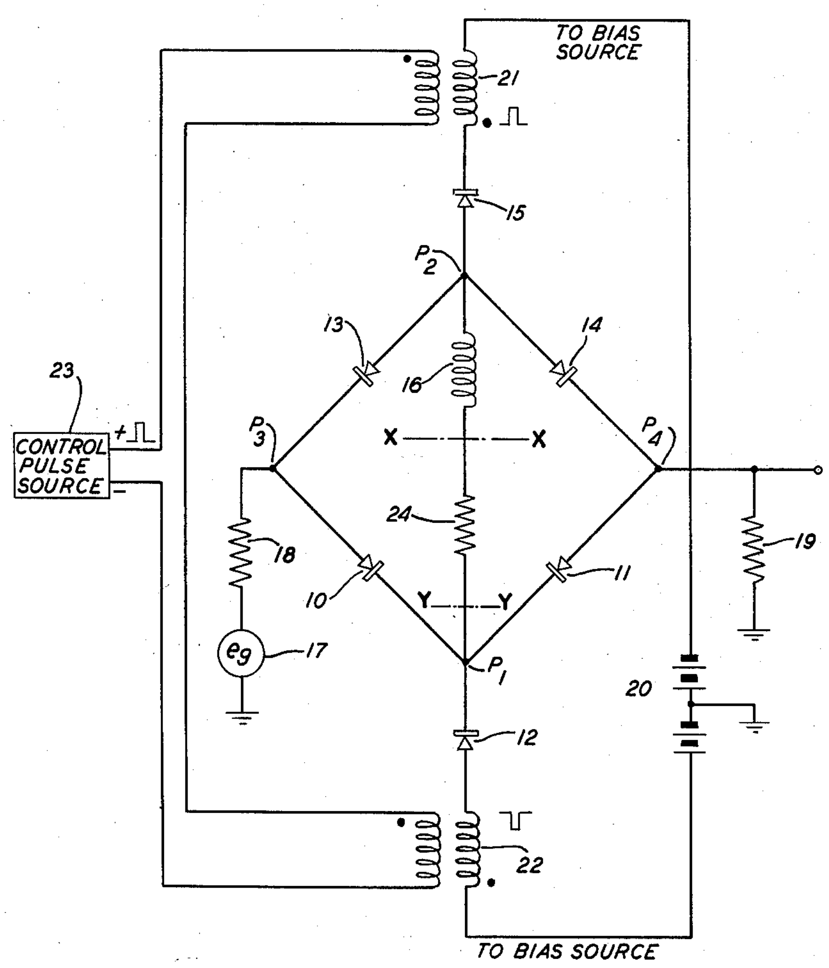

This invention relates to gate circuits and more particularly to gate circuits useful in performing a sampling function or otherwise required to provide high speed operation.

In a general sense, a gate circuit may be considered as a switch which when enabled or "closed" interconnects an input circuit and an output circuit. Ordinarily, but not necessarily, the gate or control signal selects a portion of a wave which exists during one or more selected time intervals. In certain pulse circuitry as employed in computers, the only output signal required is a pulse and the length of the output signal is the only quantity controlled. Gate circuits for such use are commonly referred to as And circuits in view of the logical function they perform.

In transmission gates or sampling circuits, however, instantaneous values of the waveform of the input signal must be reproduced faithfully during the time that the gate is enabled and in those gate circuits employed for sampling, the required speed of operation is such that the proper reproduction of the instantaneous value may be difficult to accomplish. This arises from the fact that the gate may not open rapidly enough to prevent modification of the amplitude of the sampled or gated signal during the switching time.

One common gate and sampling circuit comprises a T network of asymmetric devices with like electrodes of the devices connected together. The devices forming the cross part of the T configuration furnish a series connection between input and output circuits and the remaining device of the configuration is referred to as the shunt device. A voltage in series with the shunt device provides the control for the switch. Briefly, one polarity of the control voltages causes current to flow from the control source through the shunt diode in its low conducting condition to bias the series diodes in their non-conducting state. In this condition the T network has a high attenuation between input and output circuit. A control voltage of the other polarity cuts off the shunt diode and enables input current to flow through the series diodes in their low resistance state. In this condition the T network has a low attenuation between input and output circuits. To avoid clipping or limiting, the input current that can be handled is considerably smaller than the zero-to-peak amplitude of the control voltage since the current must not be allowed to reverse in either of the series diodes.

An improvement that has been suggested for such T network gates consists of biasing the junction of the asymmetric devices with a biasing supply and resistor thereby permitting the use of smaller control voltages as compared to the sampled voltage. A further improvement also previously suggested involves the substitution of an inductor in place of a resistor in the biasing circuit and using the stored current of the inductor to turn the gate or sampling circuit "on" or "off." This results in a reduction in both the required biasing voltage and in the power capacity of the source from which the bias is derived. In some instances it is desirable that such T networks be employed for gating applied voltages of both positive and negative polarities and this has been accomplished by connecting two T gates back-to-back with one gate arranged to handle positive portions of the applied signal and the other gate arranged to handle negative portions of the applied voltage. The biasing means for a double T may be either a biasing supply and a passive element employed at each junction or a single biasing supply connected to a center-tapped resistor or inductor of appropriate size attached at each end to a junction. Either of the biasing arrangements is cumbersome and contains both active and passive circuit elements of unnecessary magnitude.

It is therefore an object of the present invention to provide a simplified and fast acting gate or sampling circuit of double T configuration.

According to the invention it is recognized that one junction potential of a double T or bridge configuration is sufficiently positive to turn off its associated series asymmetrical devices when the shunt asymmetric devices are conducting and to turn on the series asymmetric devices of the other T network when the shunt asymmetric devices are non-conducting. Likewise the other junction potential is sufficiently negative to duplicate the same action in response to the control voltages applied to its shunt asymmetrical devices. The differential actions of the junction potentials may be conveniently employed, therefore, to simplify the bridge configuration by reducing the power requirements of the active circuit elements and the magnitude of the inductances for either or both T networks. To this end a "floating inductor" is connected between the junctions of the two T networks. The characteristic of the inductor voltage occurring at the junctions is such as to permit the series asymmetrical devices to rapidly change from a non-conducting state to a conducting state improving the fidelity with which a voltage appearing at the input of the bridge configuration is reproduced at the output during the enabled interval.

In accordance with one embodiment of the invention two sets of three T connected diodes, which may be semiconductor devices or conventional vacuum tube diodes, are employed with the cathodes of the diodes of one set connected together while the anodes of the diodes of the other set are similarly connected together. The two sets of semiconductor devices are connected together with the series paths in parallel to form a bridge arrangement having one series diode in each branch. Controlling pulses are applied in opposite phase to the terminals of the shunt diodes of the two T's. The input and output circuits are taken from the opposite sides of the bridge at the junctions not involving the shunt diodes. An inductor is connected between the junction points of the two T networks. A current is passed through the inductor to bias the junctions so that the bridge is placed in the "open" condition. This is accomplished by connecting the terminals of the shunt diodes to a voltage source such that the shunt diodes are placed in their conducting state. When controlling pulses are applied to the shunt diode terminals, these diodes are placed in their non-conducting state, the series diodes are switched to the conducting state, and the inductor discharges stored current into the bridge diodes to draw the input and output potentials together.

Figure 1A:
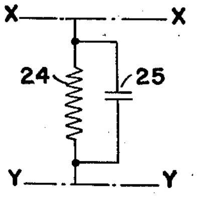

The invention may be better understood from a consideration of the following detailed description when read in accordance with the accompanying drawing in which: Fig. 1 shows schematically an electronic switching arrangement embodying the principles of the invention; and, Fig. 1A is a modification of the embodiment of Fig. 1.

In the drawing the switch is shown as comprising two T circuit configurations each having three asymmetrically conducting devices or diodes. The first T configuration includes diodes 10, 11 and 12. These diodes are shown as semiconductor asymmetrical devices but it will be understood that in some applications vacuum tube diodes may advantageously be employed in the T configurations.

The direction of the arrowhead in the symbol for the asymmetrical device indicates the low resistance direction of positive current flow through the device. Relating the direction of current flow in a semiconductor device to that in a vacuum tube diode, the arrowhead terminal may be considered as the anode and the other terminal of the device may be considered as the cathode. Thus, in the first T configuration described above, the cathodes of the diodes are connected to a common junction $P_1$. The second T configuration includes semiconductor devices or diodes 13, 14 and 15 and the anodes of the diodes are connected to a common junction $P_2$. To arrange the two T circuit configurations in bridge fashion to form a bidirectional switch, the series diodes 10 and 11 of the first T configuration have their anodes connected to the cathodes of diodes 13 and 14 respectively, the series diodes of the second T configuration. An inductor 16 in series with a padding resistor 24 is connected between junctions $P_1$ and $P_2$ to form a bridge configuration.

The primaries of transformers 21 and 22 are connected in series and the serially connected primary windings are connected across a conventional source of pulses 23. This source produces pulses which control the operation of the switch and is referred to as the control pulse source. The series circuit of source 23, transformers 21 and 22, is referred to hereinafter as the control circuit. The windings of transformers 21 and 22 are arranged, as shown on the drawing, to provide positive pulses at diode 15 and negative pulses at diode 12.

The anode terminal of shunt diode 12 and the cathode terminal of shunt diode 15 are connected respectively through the secondary windings of transformers 22 and 21 to the positive and negative terminals of a voltage source shown here as comprising a battery 20 having a grounded tap at its center. The polarities of the bias voltages supplied to the diodes from source 20 are such as to place diodes 12 and 15 in their conducting state. It is apparent that a loop current will flow from source 20 through the shunt arm diodes 12 and 15, resistor 24 and inductor 16 of the bridge configuration, to establish potentials at junctions $P_1$ and $P_2$. This circuit is referred to hereinafter as the bias circuit.

The bridge configuration in conjunction with the control and bias circuits is adapted to control the bidirectional flow current between generator 17 having internal resistance 18, and a load 19. The connection between generator 17 and the common lead of diodes 10 and 13 is referred to as junction $P_3$. The connection between load resistance 19 and the common lead of diodes 11 and 14 is referred to as junction $P_4$. The output voltage of generator 17 is constrained within the potentials appearing at junctions $P_1$ and $P_2$. Likewise, the load potential appearing across resistor 19 is also constrained within the limits of the potentials appearing at junctions $P_1$ and $P_2$.

The generator output potential appearing at junction $P_3$ of the bridge may be either positive or negative with respect to ground. As stated above, the positive maximum of the potential applied to junction $P_3$ is by choice, limited to a value less than that at junction $P_1$. Likewise the negative maximum of the potential applied to junction $P_3$ is limited to a value less than the negative potential at $P_2$. Consequently, for a positive generator output, diode 10 can not be placed in the conducting state nor can diode 13 be placed in the conducting state since its cathode is connected to generator 17. Diodes 11 and 14 are connected to the grounded side of generator 17 through grounded load resistor 19. In the absence of any potential applied or existing across load 19, the bias voltages established by the bias source 20 at bridge junctions $P_1$ and $P_2$ are in the proper polarity with respect to ground to prevent conduction in diodes 11 and 14 respectively. It is apparent, therefore, that in the absence of control voltages on shunt diodes 12 and 15, each T of the bridge configuration has a high series impedance and a low shunt impedance which presents a high attenuation to any positive voltage appearing at the bridge terminal of generator 17. In a corresponding fashion the circuit will attenuate negative voltages of generator 17.

The appearance of a pulse in the control circuit causes a positive voltage to appear at the cathode of diode 15, and this voltage is of sufficient magnitude to place that diode in a non-conducting state. Similarly, and simultaneously the control circuit provides a negative voltage at the anode of diode 12 of sufficient magnitude to place that diode in a non-conducting state. With both diodes 12 and 15 in a non-conducting state, the circuit branch comprising resistor 14 and inductor 16 is disconnected from ground. As a result of current flow in the bias circuit as previously described, inductor 16 has energy stored in it in the form of a magnetic field which develops an E. M. F. of self-induction across inductor 16 when the branch of which it is a part is disconnected from ground. The E. M. F. of self-induction reverses the polarities of the potentials at junctions $P_1$ and $P_2$ in accordance with well known principles of electromagnetism placing diodes 10 and 13 in a conducting state for negative and positive potentials respectively appearing at the bridge terminal of generator 17. Thus, diode 14 is placed in a conducting state for positive voltages of generator 17 since its anode is connected to junction $P_2$ now at a positive potential and its cathode is effectively connected to ground. Similarly, diode 11 is placed in a conducting state for negative voltages from generator 17 since its cathode is connected to junction $P_1$ now at a negative potential and its anode is effectively connected to ground.

Thus, during the presence of a control pulse, positive voltages from generator 17 cause current to flow through diode 10, padding resistor 24, inductor 16 and diode 14 to load resistor 19. In a corresponding manner, negative voltages from generator 17 cause current to flow through diode 13, inductor 16, padding resistor 24 and through diode 11 to load resistor 19. The current flow through the bridge is such as to equalize the potentials at junctions $P_3$ and $P_4$. For example, if the potential at the load or $P_4$ should increase above $P_3$, as for example where resistor 19 is replaced by a capacitor, as in a conventional sample and hold circuit, then reverse current occurs through the bridge. Assuming current for a positive voltage at the output generator 17 then diodes 10 and 14 are in the conducting state for reasons previously described. If the potential at $P_4$ increases above $P_3$ then diode 14 is cut off since its cathode is attached to junction $P_4$, and current flows from the load through diode 11, padding resistor 24, inductor 16 and diode 13 so as to increase the potential at junction $P_3$. A storage device (not shown) connected between $P_3$ and ground is usually employed to receive the reverse flow of current so as to increase the potential of junction $P_3$ to equal the potential at junction $P_4$.

A second embodiment of the invention as illustrated in Fig. 1A, involves the addition of a capacitor 25 shunting padding resistor 24 as indicated in the drawing. The capacitor also acts to store energy during the period that current is flowing in the bias circuit. The cooperative action of capacitor 25 in storing energy enables the magnitude of the inductance to be reduced without reducing the effectiveness of the operation of the switch.

It is evident that the differential action occurring at junctions $P_1$ and $P_2$, as previously described, enables the inductor to be floated between the junctions instead of connecting each junction to its own individual passive element and biasing supply as in prior art devices. The simplification of the present device permits an inductor or other passive element of reduced magnitude to be employed in the bridge circuit. The power requirements for the floating inductor as compared to the power requirements for conventional biasing methods is also less since the current required by the floating inductor is less than that required by conventional biasing methods. It will be appreciated, therefore, that where a large number of double-T gates are required, as for example, in multichannel pulse modulation system, considerable savings in power requirements and the cost of such gates will be achieved by the use of the device according to the invention. The simplified device has the ability to sample at a fast rate since the voltage at each junction rises as a function of $$L\frac{di}{dt}$$

thereby permitting the series diodes to change from non-conducting to conducting in a shorter time interval than occurs in conventional gates.

Although the invention has been described in connection with specific embodiments, other modifications and embodiments will readily occur to one skilled in the art without departing from the spirit of the invention.

What is claimed is:

1. An electronic gate and sampling circuit having an input and output comprising, a pair of T networks of asymmetrically conducting devices, each network having a series arm of two or more devices and a shunt arm of at least one device, one network having the anodes of the devices connected to the junction thereof, the other network having the cathodes of the devices connected to the junction thereof, the series arms of said networks being connected in parallel between the input and output of said circuit, an energy storing impedance in series with a resistor connected between the junctions of the two networks, means for biasing the shunt arms into their low resistance condition, control means for the circuit arranged to produce an output capable of overcoming the action of said biasing means, and means connecting the control means to the shunt arms of each network.

2. An electronic gate and sampling circuit comprising two sets of three diodes each connected in T configuration with two series diodes in a first branch and a branch comprising a shunt diode, the cathodes of the diodes of one set and the anodes of the diodes of the other set being connected respectively to first and second junctions comprising the common points of said T's, an input and an output circuit, means for connecting the series branches of the sets of diodes in parallel between said input and output circuits to form a bridge, means for normally biasing the series diodes of each set into their non-conducting condition, an inductor connecting the first junction and second junction, and means for impressing negative control impulses on the anode of the shunt diode associated with the first junction and simultaneously impressing positive control impulses on the cathode of the shunt diode associated with the second junction to place the series diodes of each network into their conducting condition.

3. An electronic gate and sampling circuit comprising two sets of three diodes each connected in T configuration with two series diodes and a branch comprising a shunt diode, the cathodes of the diodes of one set and the anodes of the other set being connected respectively to first and second junctions comprising the common points of said T's, an input and output circuit, means for connecting the series diodes of each set in parallel with unlike electrodes at each connection, means for connecting the input circuit to one parallel connection and means for connecting the output circuit to the other parallel connection, means for normally biasing the series diodes of each set into their non-conducting condition and the shunt diodes of each set into their conducting condition, an energy storing impedance and a resistor connected in series between the first and second junctions, and means for impressing negative control pulses on the anode of the shunt diode associated with the first junction and simultaneously impressing positive control pulses on the cathode of the shunt diode associated with the second junction to place the series diodes of each set into a conducting condition and the shunt diodes of each set into a non-conducting condition.

4. Apparatus as defined in claim 3, wherein the impedance in series with the resistor connecting the first and second junction comprises an inductance.

5. The further combination in accordance with claim 1, of a capacitor connected in parallel with said resistor.

6. Apparatus as defined in claim 3, wherein the means for impressing negative and positive control pulses on the anode and cathode of the shunt diodes respectively comprise pulse transformers whose secondaries are serially connected to the anode and the cathode of the shunt diodes of the first and second sets of diodes respectively, and whose primaries are serially interconnected in reverse polarity and are energized from a source of control voltage.

References Cited in the file of this patent

UNITED STATES PATENTS 2,782,307 Von Sivers et al. ---------- Feb. 19, 1957